(No Model.)
F. W. TUCKER.
WHEEL TIRE.
No. 497,995. Patented May 23, 1893.
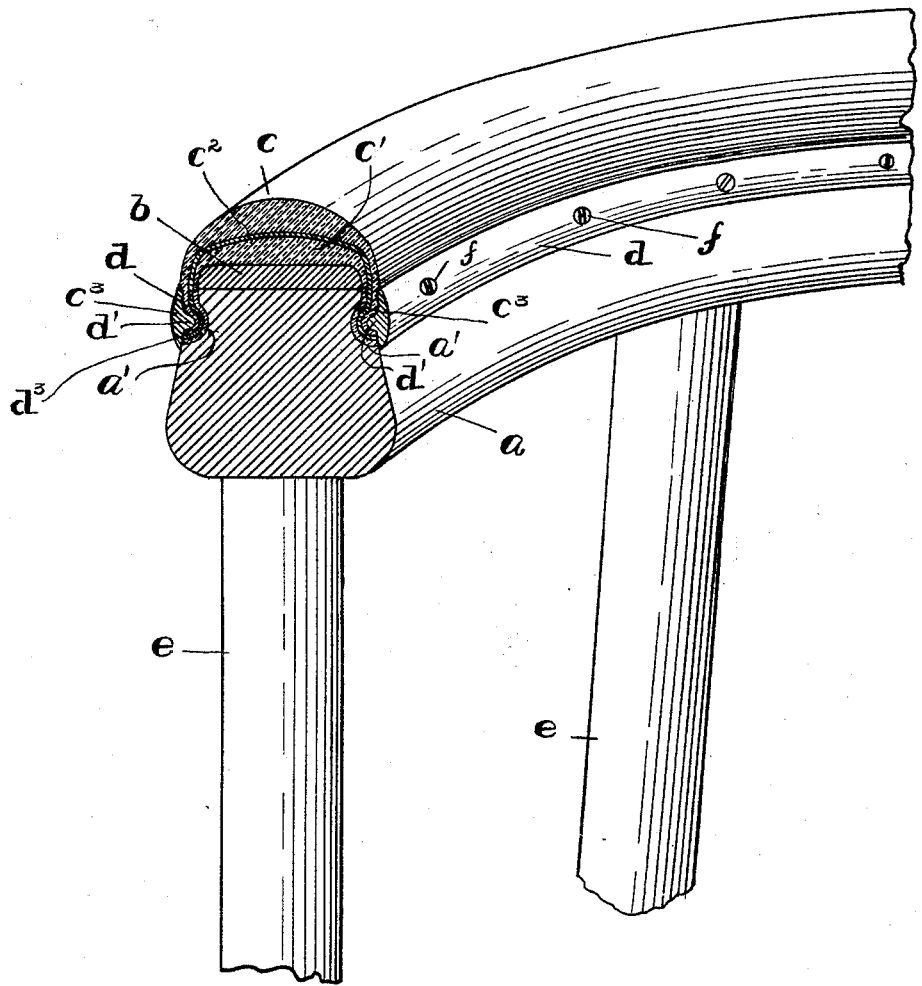
WITNESSES:
A. D. Harrison.
Parker Davis,
INVENTOR:
F. W. Tucker
by Wright Brown Crosley
Attys

UNITED STATES PATENT OFFICE.

FRANK W. TUCKER, OF WINTHROP, ASSIGNOR OF ONE-HALF TO FERDINAND F. FRENCH, OF WINCHESTER, MASSACHUSETTS.

WHEEL-TIRE.

SPECIFICATION forming part of Letters Patent No. 497,995, dated May 23, 1893.

Application filed February 27, 1893. Serial No. 463,838. (No model.)

*To all whom it may concern:*

Be it known that I, FRANK W, TUCKER, of Winthrop, in the county of Suffolk and State of Massachusetts, have invented certain new and useful Improvements in Wheel-Tires, of which the following is a specification.

The object of this invention is to provide a construction whereby an elastic covering can be readily and securely applied to the felly or rim of a wooden wheel.

This invention is illustrated in the accompanying drawing, in which a perspective view of a portion of a wheel embodying my invention is shown, the tire appearing in cross section.

The letter $a$ designates the felly or rim of the wheel to which the spokes $e$ are fastened. This felly is made with a groove $a'$ in its two opposite sides, said grooves extending entirely around the wheel. A metal tire $b$ is secured on the face of the felly in the usual or any suitable manner. The elastic covering or tire consists of two layers $c$ and $c'$ of rubber with an interposed stay-piece $c^2$ of canvas or other non-elastic fabric. The elastic tire is thickest at the center, or that portion where it bears on the ground or surface over which the wheel travels, and is reduced in thickness toward each outer edge as shown at $c^3$. The fabric stay-piece however, extends to the outer edge on each side. The elastic tire is fitted closely over the metal tire $b$ and the reduced portions $c^3$ are engaged in the grooves $a'$ of the felly. Bands $d$ preferably of steel are placed on opposite sides of the felly, and they have ribs $d'$ conforming to the shape of the grooves $a'$, and bearing against the reduced portions of the elastic tire therein. The said bands are secured to the felly by screws $f$, which pass through the reduced portions of the elastic tire. The elastic tire is thus securely clamped to the felly of the wheel. The clamping bands $d$ may each consist of a continuous band extending around the wheel, or be made in sections as is most convenient or desirable. The said bands will preferably be formed with shoulders $d^3$ which bear against the surfaces of the felly and cover the edges of the elastic tire and thus conceal and protect them. The outer surfaces of the bands are preferably made curving so as to improve the exterior appearance of the tire.

It will be seen that my invention provides a simple and effective construction by which an elastic covering or tire may be applied to a wheel having a solid wooden felly so as to completely cover the metal facing or tire on the felly, and yet not give the wheel a clumsy appearance.

It is evident that the construction here shown for carrying out my invention may be varied in a number of ways, and therefore I do not confine myself to such construction.

Having thus described my invention, what I claim as new, and desire to secure by Letters Patent, is—

1. A wheel tire comprising in its construction a felly or rim having grooves in two opposite sides, a metal tire on said felly, an elastic tire fitting over said metal tire and reduced in thickness toward the outer edges, said reduced portions engaging the grooves in the felly, and clamping bands holding the reduced portions of the elastic tire in the grooves and secured to the felly, substantially as described.

2. A wheel-tire comprising in its construction a felly or rim having grooves in two opposite sides, a metal tire on said felly, an elastic tire fitting over said metal tire and reduced in thickness toward the outer edges, said reduced portions engaging the grooves in the felly, and clamping bands holding the reduced portions of the elastic tire in the grooves and secured to the felly by fastenings which extend through the said reduced portions, substantially as described.

In testimony whereof I have signed my name to this specification, in the presence of two subscribing witnesses, this 16th day of February, A. D. 1893.

FRANK W. TUCKER.

Witnesses:
C. F. BROWN,
A. D. HARRISON.